United States Patent
Rogers et al.

(10) Patent No.: US 9,494,384 B2
(45) Date of Patent: Nov. 15, 2016

(54) HOLSTER AND METHOD OF MAKING HOLSTERS

(71) Applicants: William H. Rogers, St. Augustine, FL (US); Matthew E. McKendrick, Jacksonville, FL (US)

(72) Inventors: William H. Rogers, St. Augustine, FL (US); Matthew E. McKendrick, Jacksonville, FL (US)

(73) Assignee: Rogers Holster Co., LLC, Jacksonville, FL (US)

( * ) Notice: Subject to any disclaimer, the term of this patent is extended or adjusted under 35 U.S.C. 154(b) by 0 days.

(21) Appl. No.: 14/163,868

(22) Filed: Jan. 24, 2014

(65) Prior Publication Data

US 2014/0252055 A1    Sep. 11, 2014

Related U.S. Application Data

(60) Provisional application No. 61/773,537, filed on Mar. 6, 2013.

(51) Int. Cl.
*F41C 33/02*    (2006.01)
*B29C 45/00*    (2006.01)

(52) U.S. Cl.
CPC ....... *F41C 33/0263* (2013.01); *B29C 45/0081* (2013.01); *F41C 33/0209* (2013.01)

(58) Field of Classification Search
CPC ............ Y10S 224/911; F41C 33/0227; F41C 33/0209; F41C 33/0263
USPC ................. 224/911, 241–244, 191–193, 912
See application file for complete search history.

(56) References Cited

U.S. PATENT DOCUMENTS

| | | | | |
|---|---|---|---|---|
| 2,531,170 A | * | 11/1950 | Tackett ................... | A45F 5/02 224/198 |
| 2,546,774 A | * | 3/1951 | Ohlemeyer ......... | F41C 33/0227 224/243 |
| 2,590,187 A | * | 3/1952 | Langos ................ | B65D 81/363 206/216 |
| 2,973,091 A | * | 2/1961 | Berry ................... | B65D 81/363 206/317 |
| 2,987,229 A | * | 6/1961 | Leclerc ................... | F41C 33/02 2/300 |
| 3,009,620 A | * | 11/1961 | Leone ...................... | B65D 5/00 206/216 |
| 3,011,687 A | * | 12/1961 | Boyt ................... | F41C 33/0227 224/243 |
| 3,128,926 A | * | 4/1964 | Stella ................... | F41C 33/0209 224/251 |

(Continued)

Primary Examiner — Brian D Nash
Assistant Examiner — Corey Skurdal
(74) Attorney, Agent, or Firm — Arthur G. Yeager

(57) ABSTRACT

A holster blank and holster for a handgun formed from a unitary molded body portion having two side holster portions joined to opposite edges of an elongate narrow spine intermediate portion by parallel living hinges. The side holster portions have outer edges brought together by pivoting the side holster portions towards each other via the living hinges so as to form the holster. The body portion includes interfacing elongate male and female locking portions which engage and lock the outer edges together. A method of producing the holster includes molding the body portion and pivoting the sides via the living hinges 90 degrees and providing a lock to interconnect the side portions adjacent the trigger guard of a handgun.

20 Claims, 20 Drawing Sheets

(56) References Cited

U.S. PATENT DOCUMENTS

| | | | | |
|---|---|---|---|---|
| 3,200,021 A | * | 8/1965 | Clark | F41C 33/0209 156/217 |
| 3,565,303 A | * | 2/1971 | Kippen | A45F 5/021 224/675 |
| 3,865,289 A | * | 2/1975 | Boren | F41C 33/0227 224/193 |
| 4,094,450 A | * | 6/1978 | Parlante | F41C 33/0263 224/243 |
| 4,696,419 A | * | 9/1987 | Holtzclaw, Jr. | F41C 33/0227 224/192 |
| D293,045 S | * | 12/1987 | Merritt et al. | D3/222 |
| 4,759,482 A | * | 7/1988 | Olsen | F41C 33/0227 224/238 |
| 4,846,384 A | * | 7/1989 | Perry | F41C 33/0227 224/193 |
| 4,865,238 A | * | 9/1989 | Bianchi | F41C 33/0227 224/193 |
| 4,886,197 A | * | 12/1989 | Bowles | F41C 33/0227 224/192 |
| 5,054,670 A | * | 10/1991 | Gallagher | F41C 33/0227 224/191 |
| 5,054,671 A | * | 10/1991 | Else | F41C 33/0209 224/192 |
| 5,150,825 A | * | 9/1992 | Nichols | F41C 33/0209 224/242 |
| 5,687,891 A | * | 11/1997 | Beletsky | F41C 33/0227 224/243 |
| 5,915,607 A | * | 6/1999 | Newboult, Jr. | B26B 29/025 224/232 |
| 5,997,787 A | * | 12/1999 | Nelson | A45F 5/00 224/911 |
| 6,264,079 B1 | * | 7/2001 | Skaggs | F41C 33/0236 224/193 |
| 7,314,152 B1 | * | 1/2008 | Garrett | F41C 33/0236 224/192 |
| 7,841,497 B1 | * | 11/2010 | Gregory | F41C 33/0263 224/243 |
| D668,453 S | * | 10/2012 | Teichelman | D3/222 |
| 2003/0226866 A1 | * | 12/2003 | Har-Shen | F41C 33/0209 224/244 |
| 2010/0170923 A1 | * | 7/2010 | Abushaev | F41C 33/0281 224/243 |
| 2012/0187164 A1 | * | 7/2012 | Looper | F41C 33/048 224/243 |

* cited by examiner

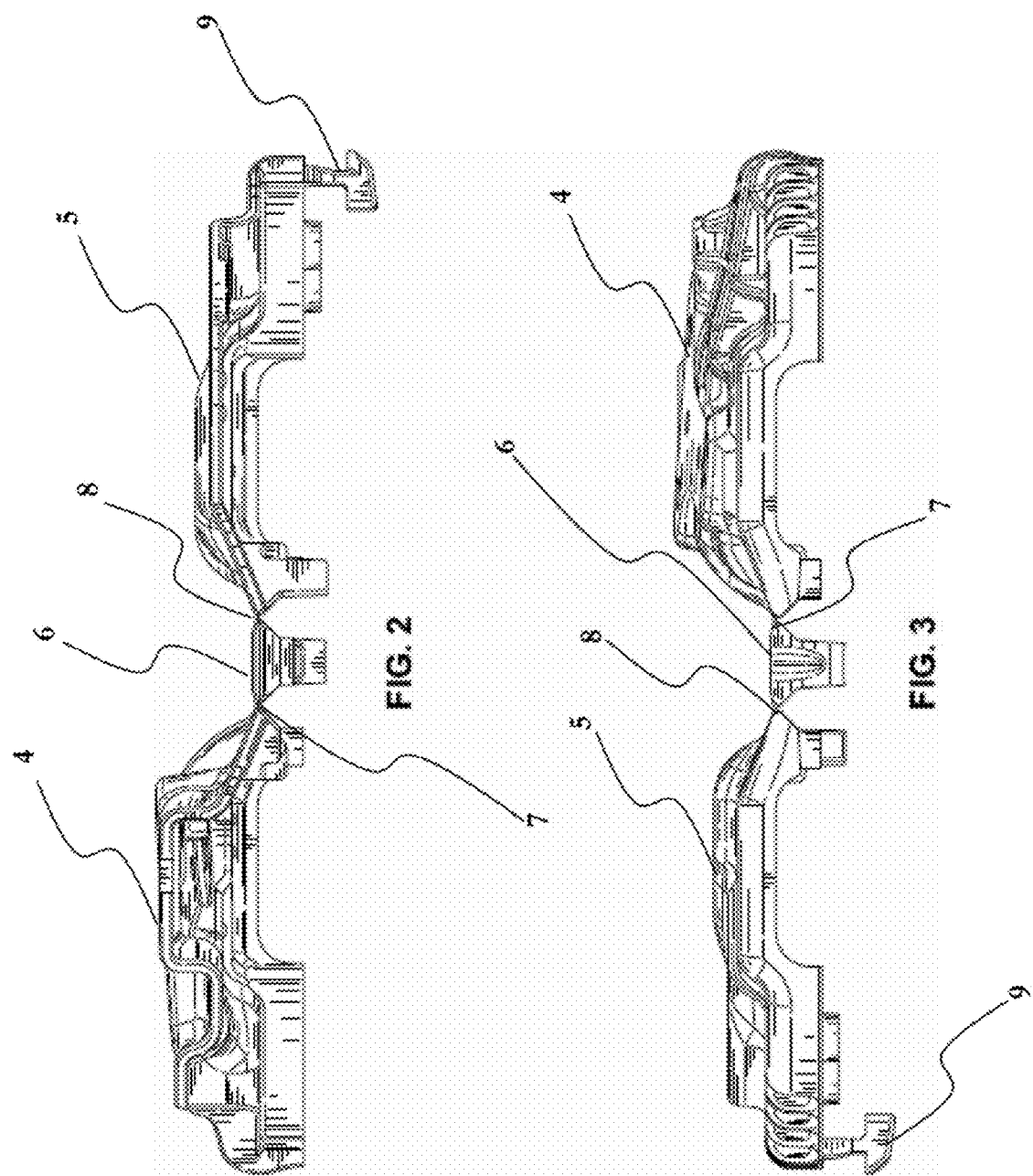

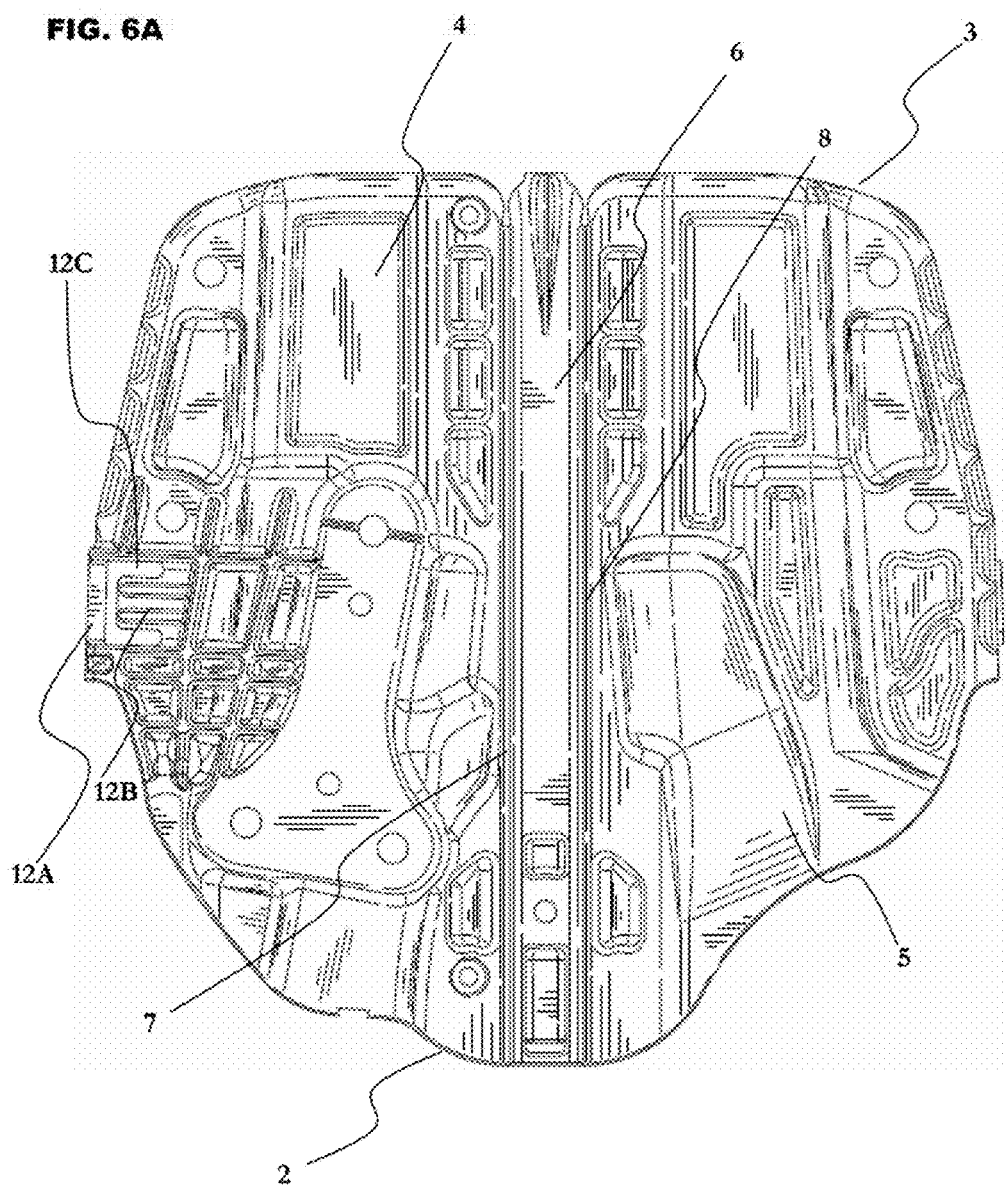

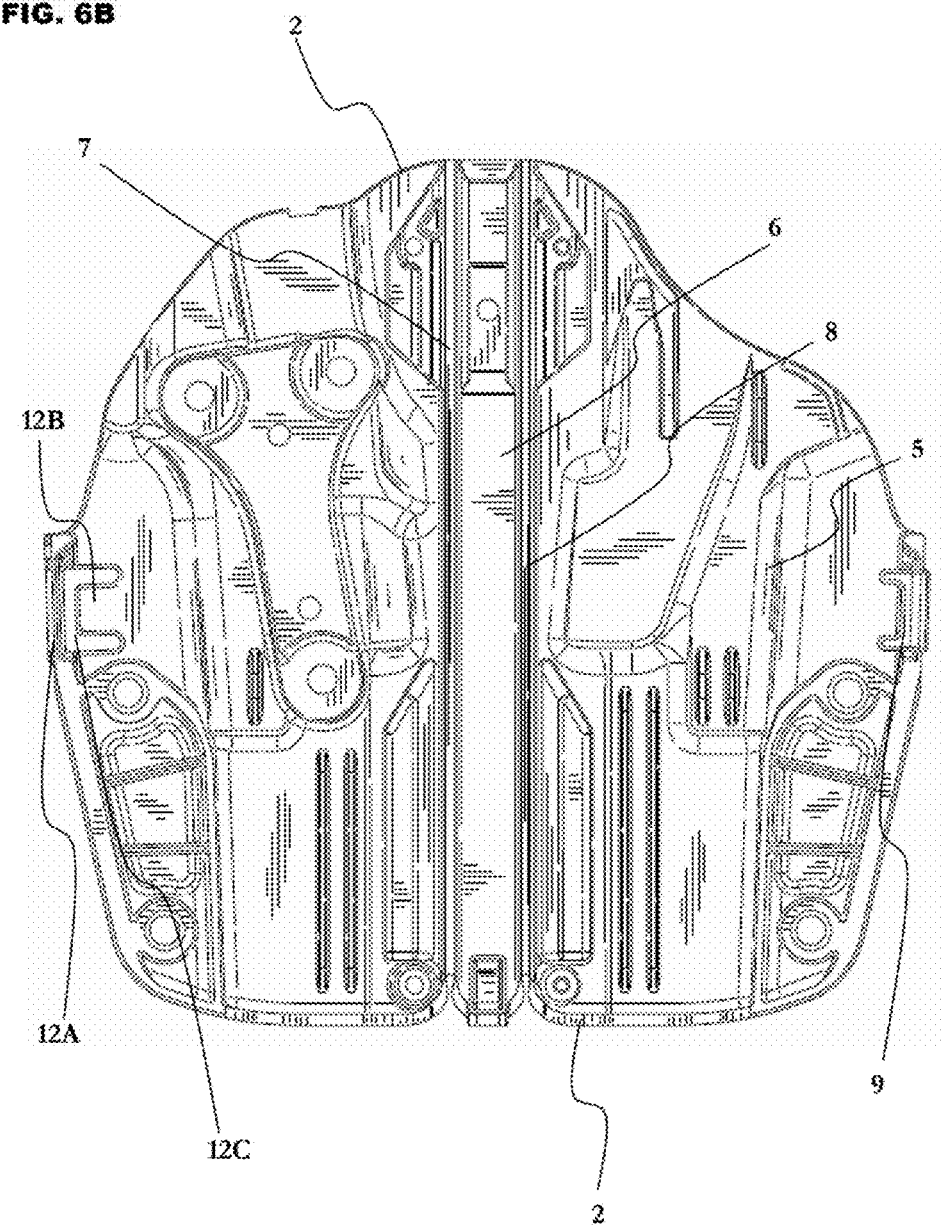

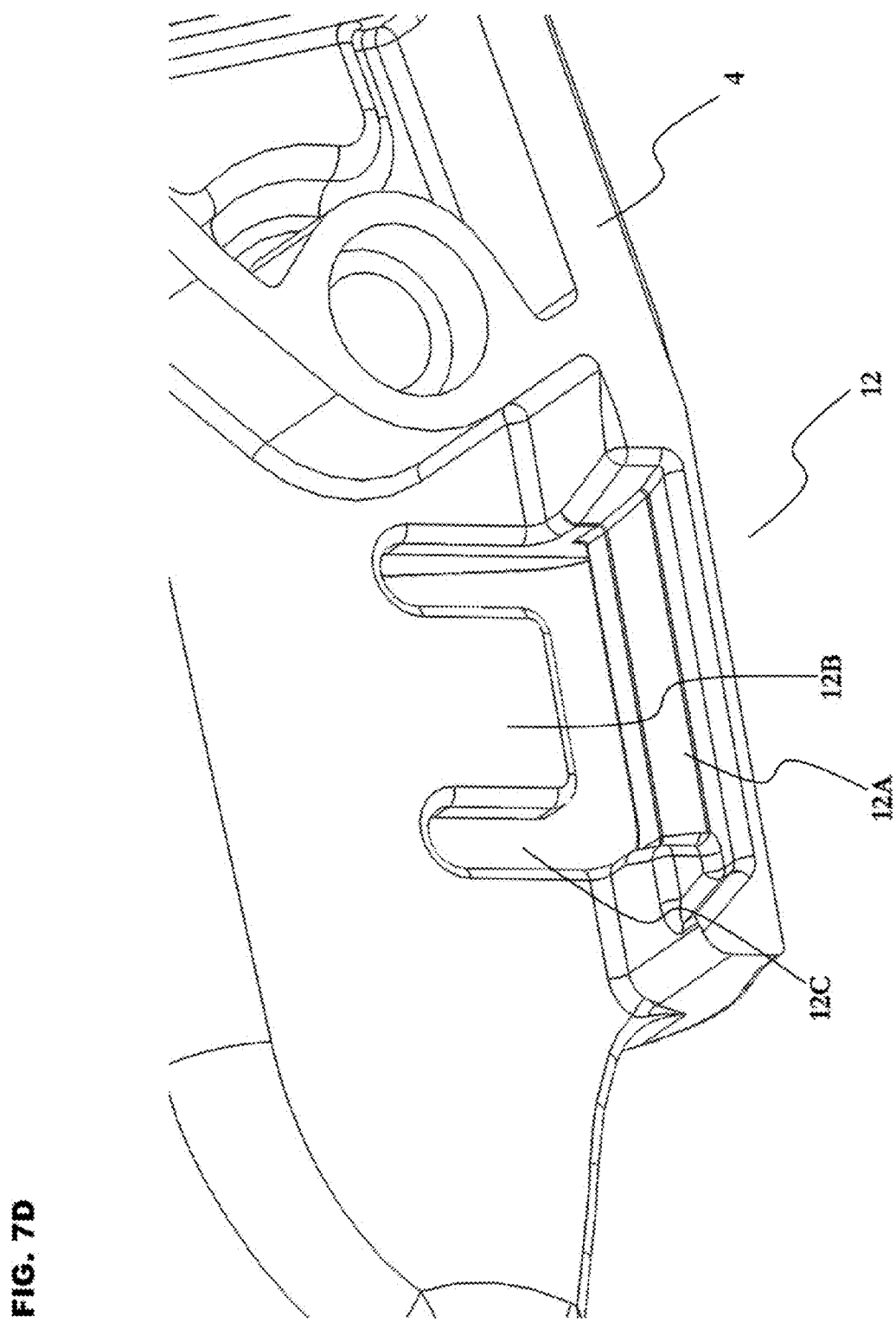

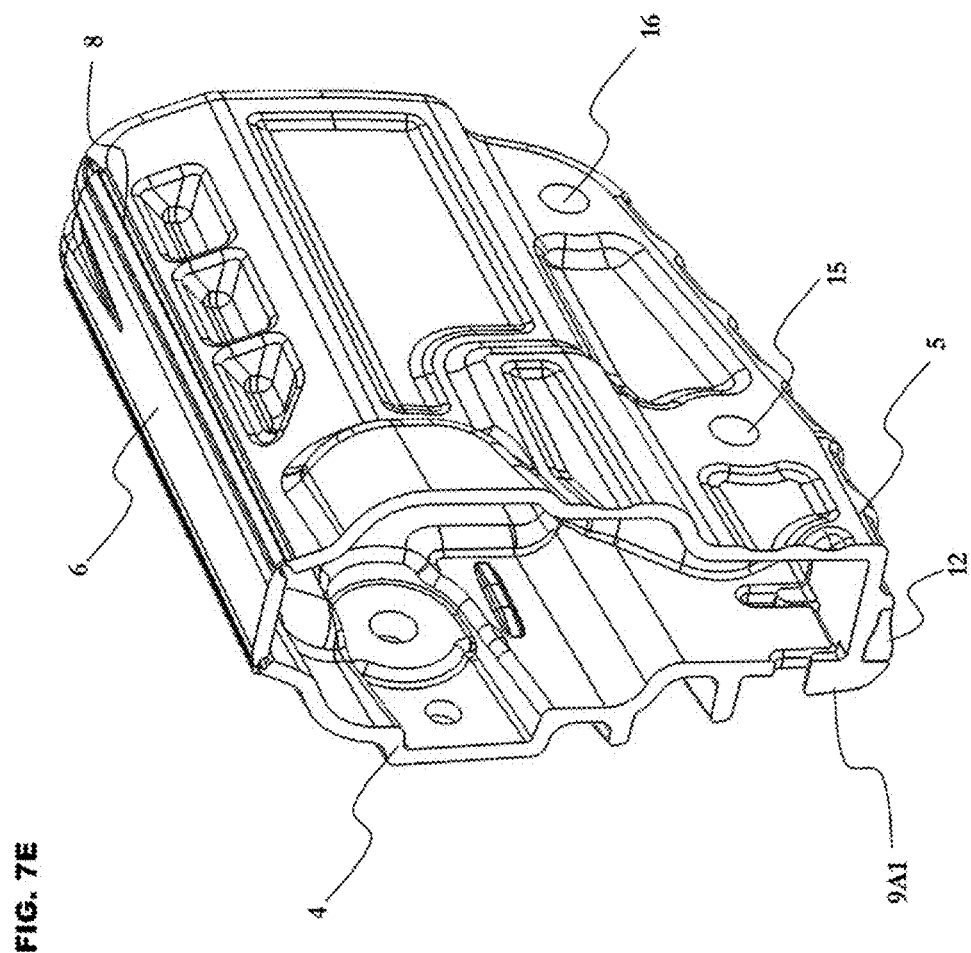

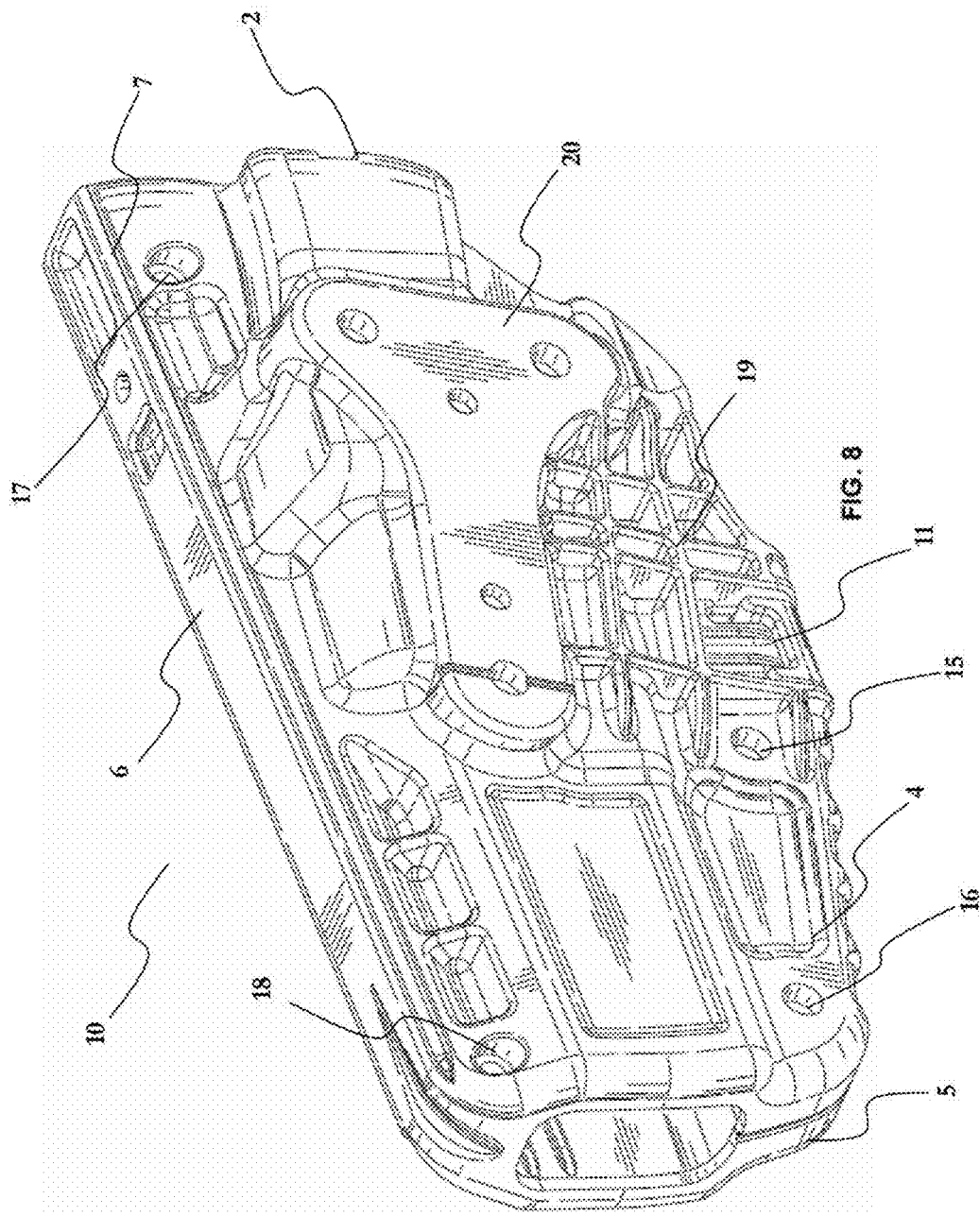

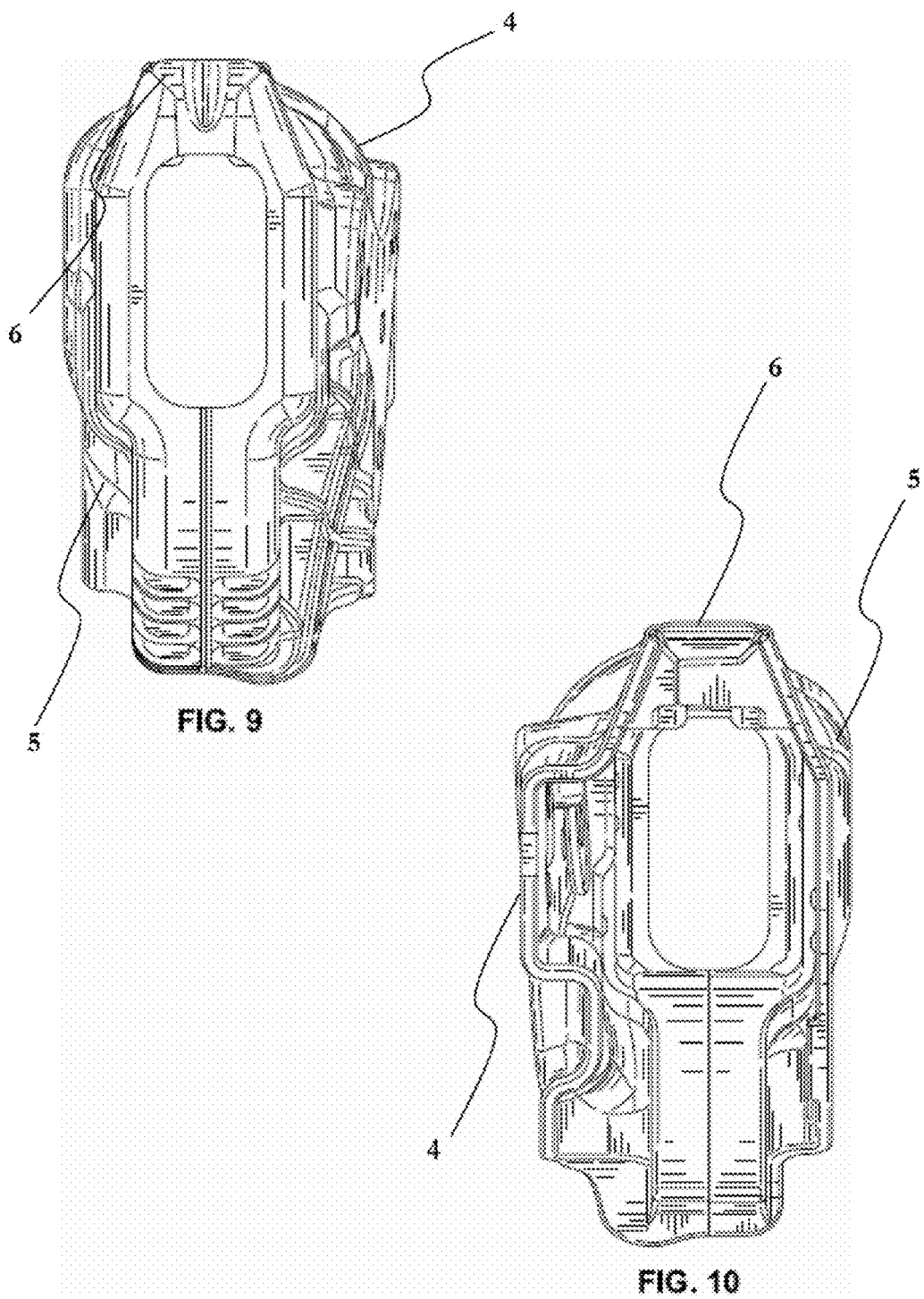

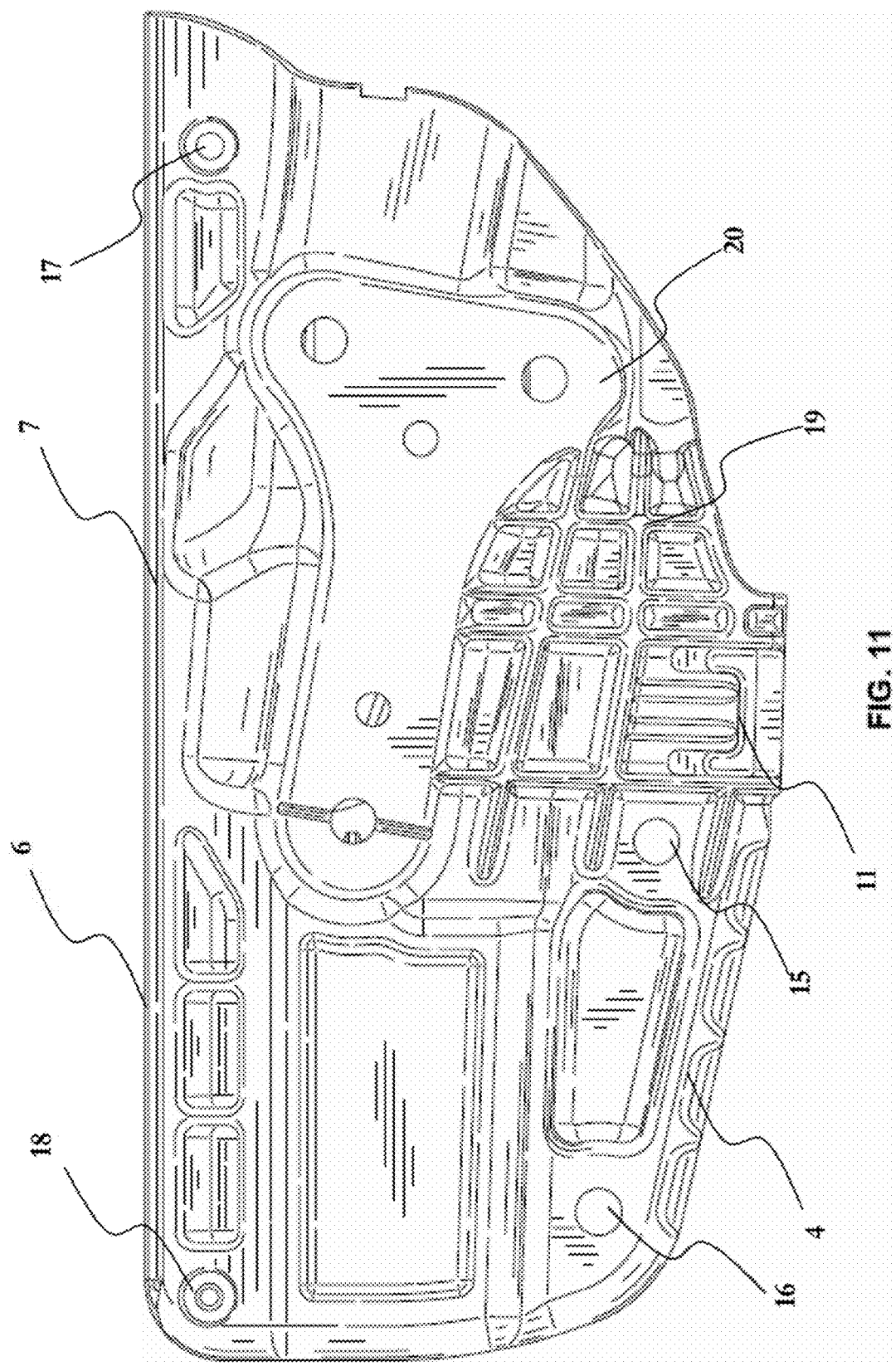

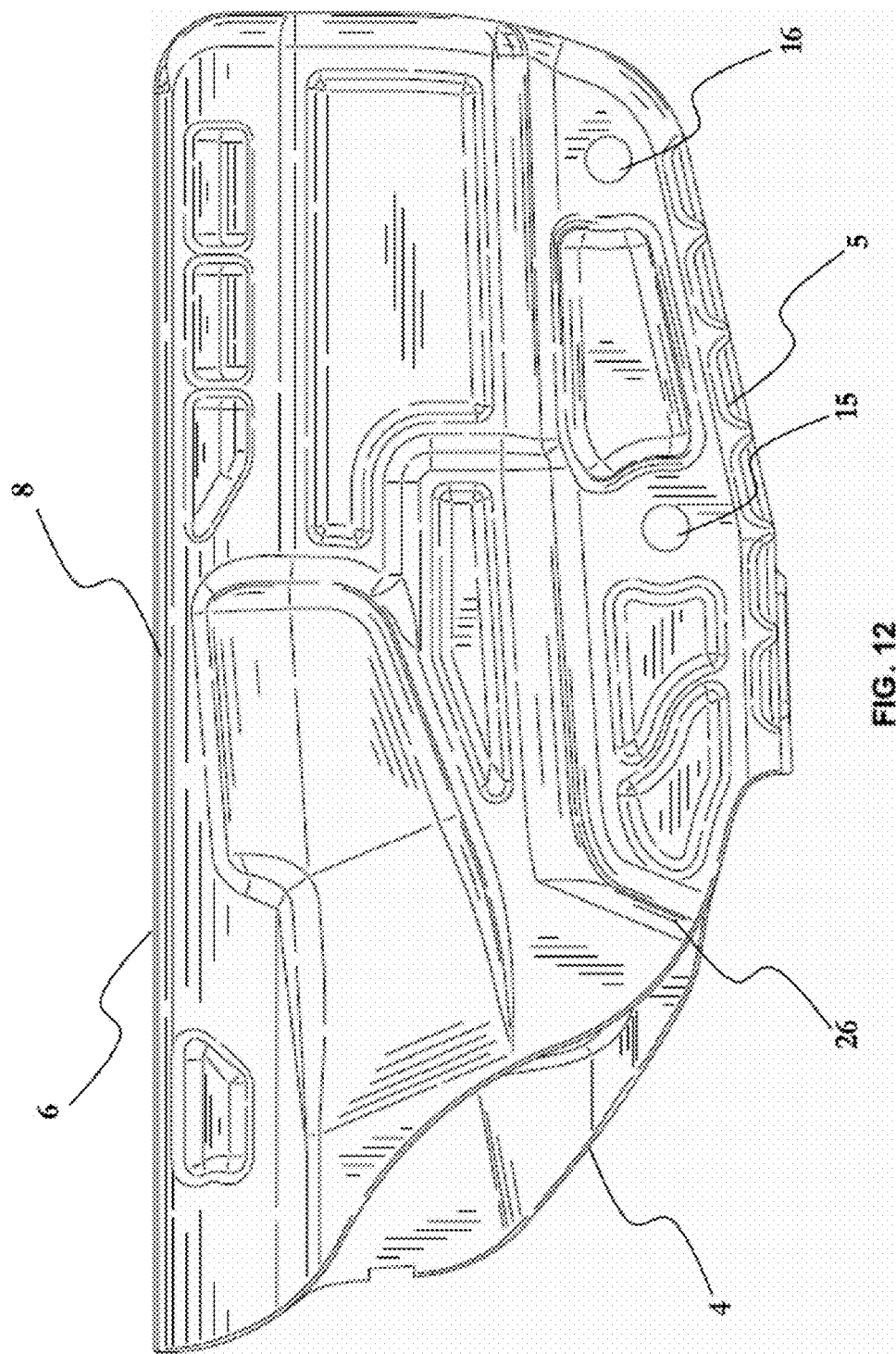

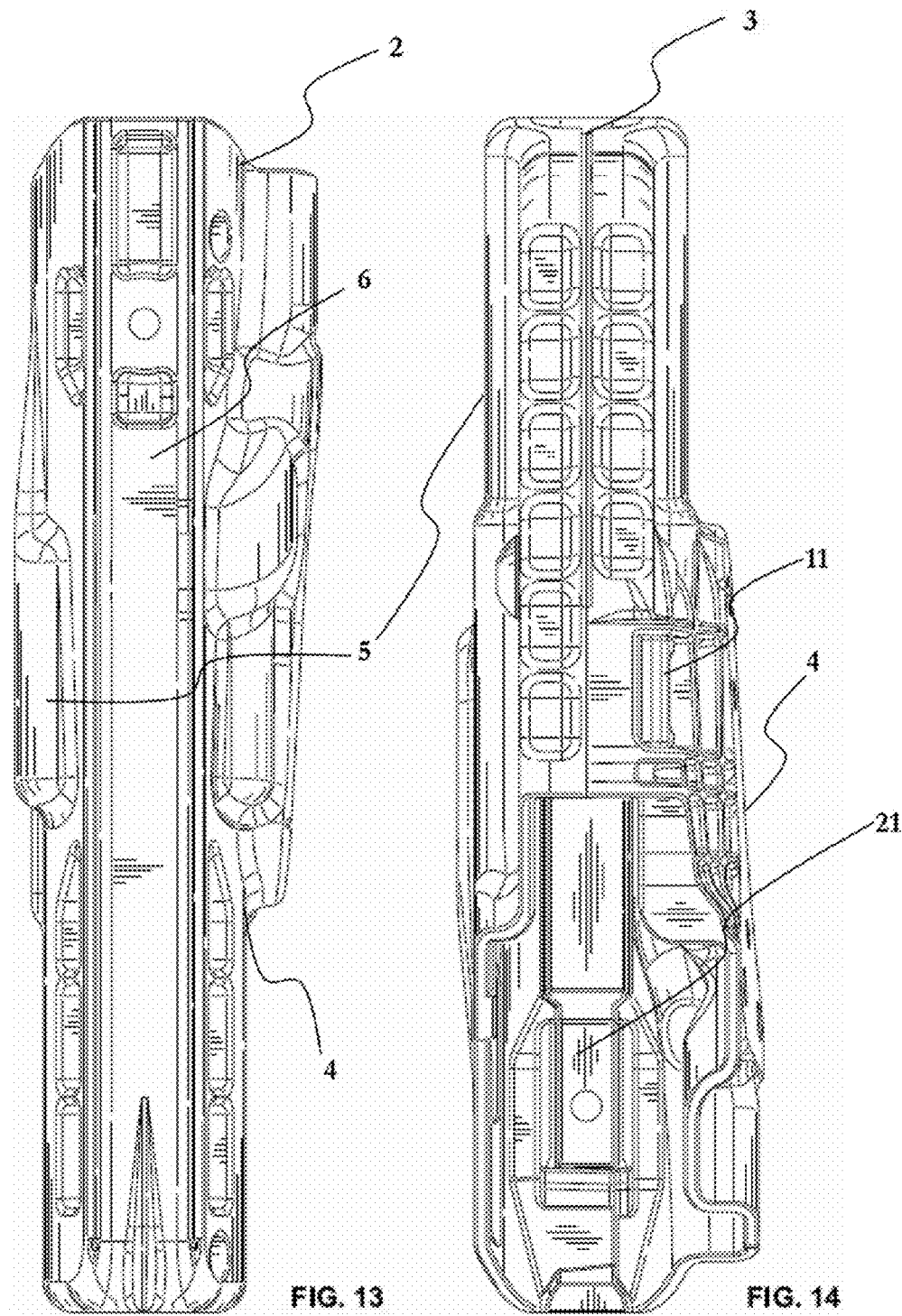

HOLSTER AND METHOD OF MAKING HOLSTERS

CROSS-REFERENCE TO RELATED APPLICATIONS

This application claims an invention that was disclosed in part in U.S. Design Patent Application 29/443,047, filed Jan. 11, 2013, entitled "Holster Blank and Holster Body", and claims priority to Provisional Patent Application 61/773,537, filed on Mar. 6, 2013.

STATEMENT REGARDING FEDERALLY SPONSORED RESEARCH OR DEVELOPMENT

Not Applicable.

REFERENCE TO MICROFICHE APPENDIX.

Not Applicable.

BACKGROUND OF THE INVENTION

1. Field of the Invention

The present invention relates to firearm holsters. More particularly, the invention pertains to a holster formed by folding a molded holster blank such that its two clam-like halves/sides come together and can be joined to form a holster configuration that is capable of withstanding the type of "snatch" test necessary to qualify as a law enforcement duty pistol or handgun holster. Specifically, the holster has an Automatic Locking System (ALS).

2. Relevant Art

In general, weapon retention is of critical importance for law enforcement personnel. Recent developments in this field focus on the inclusion of locking/retention systems for holstered handguns that must be released by a lever, button or other means in order to release the handgun from the holster, Representative and/or exemplary applications and/or patents related to this field include: U.S. Ser. No. 11/672,826 filed Feb. 8, 2007 (Pub. No. 2007/0181619), for a "Modular Holster for Handguns and the Like", invented by Seyfert et al.; and more especially, U.S. Pat. No. 7,694,860 for a "Handgun Locking Device" issued Apr. 13, 2010, to Clifton. Another patent, U.S. Pat. No. 2,987,229, issued in 1958 for a "Molded Plastic Pistol Holster" by LeClerc is of more limited applicability, but serves to provide some insight into the field of one-piece molded plastic holster construction.

However, none of these systems and inventions provides or renders obvious the features taught and embodied in the instant invention. The LeClerc patent provides some general insight into the primitive level of unitary molded holster construction, but does not deal with issues of weapon retention. The Seyfert application describes a holster (including a locking system) formed from multiple pieces and alludes to the possibility of a one pieced unitary molded component being used to form such a holster. Nonetheless, it provides no teaching or insight as to how this might be accomplished, particularly in a manner that is capable of withstanding a snatch test.

The Clifton Automatic Locking System ("ALS") holsters are also made by joining separate sections together. Thus, this patent also fails to deal with issues related to molding/construction of the holster body from a single work piece in the context of weapon retention. However, the Clifton ALS holster has been able to pass the type of "Snatch Test" required by most Law Enforcement units. The "Snatch Test" is meant to stimulate a handgun being forcibly taken from the holster of a Law Enforcement officer by, e.g., a suspect or assailant. The ability of a holster to retain a holstered handgun against this form of action/attack is important for the safety of the Law Enforcement Officer, and could very well mean the difference between life and death.

The current design and manufacture of the aforesaid thermoformed ALS holsters results in a holster body having zero points of separation, and results in a "double-wrap" of plastic material in the areas of greatest force during a snatch test: the trigger guard. However, due to manufacturing and cost constraints, development and production of a unitary injection molded holster body that can achieve the same results as a holster body formed from separate thermoformed sections has been elusive. Almost every design that will allow a holster to be injection molded has resulted in joints and mating separations which cannot withstand the force of a snatch test, most notably in the area of the trigger guard, which receives the lion's share of the forces applied during a snatch test. Efforts to create a uni-body design for a holster/holster blank that is suitable for injection molding has resulted in either an unacceptably bulky holster, or in mold tooling that is so expensive and complex that it is impractical.

SUMMARY OF THE INVENTION

In one aspect of the present invention, there is provided an Automatic Locking System (ALS) Holster that can be injection molded as a single piece as opposed to being produced in separate sections using the thermoforming process in current use. This represents a significant breakthrough as only ALS holsters formed in thermoformed sections have previously been able to pass such a "Snatch Test". It is accomplished using a "living hinge" holster design. More specifically, the design includes an intermediate spine portion joined on either side by living hinges to separate holster halves/sides. This allows the living hinges to be bent through a lesser angle than would otherwise be needed to join the two halves together by a single hinge. The hinge design is such that it allows the plastic material to bend at 90°, but not fracture along the living hinges. Likewise, in keeping with the overall goals and purposes of the invention, this living hinge design has proved capable of passing the snatch test without fracturing. Using this design has allowed the manufacture of a single-body holster with one tool and a minimal amount of assembly.

In another aspect of the instant invention, a trigger guard lock is provided that can also pass and survive the stresses imposed by the snatch test. As part of the assembly process, the right and left halves of the holster are folded inward toward each other, via the living hinges described above, until they touch at their edges opposite the edges by which they are joined via living hinges to the spine portion. The trigger guard lock then engages and locks the holster halves together. The trigger guard lock is a vital component of the invention. It locks the two halves of the holster together, and provides an extremely strong connection and reinforcement at the trigger guard where the highest force is applied during the snatch test, The lock is designed to be easy to snap together, but virtually impossible to disengage without the use of a tool.

The male side of the lock features a U-shaped protrusion. The two upper protrusions that form the "uprights" of the U-shape directly contact the left side of the trigger guard on the handgun. The lower face of the male side of the lock is chamfered to allow easy engagement into the female side of the lock. The back side of the male lock is cleared out at a near right angle cut. The cut away area forms the locking surface against the outside of the female lock, and is primarily responsible for resisting the forces applied in a snatch test. The female lock provides a pocketed area for the neck of the male lock to interface. The female lock also contains an engagement tab that pushes out of the way during install, but then engages into the "U" portion of the male lock preventing the male lock from working its way out of the U-shaped slot in the female lock. This engagement tab must be pried out of the way with a flat blade screwdriver or the like in order to disengage the male lock from the female lock.

In still other aspects, it will be seen that the ALS holster of the invention has additional means for securing the two sides forming the holster together and other features as explored below that contribute to its purpose and goals as a sturdy, secure, durable and effective duty pistol holster with automatic locking system features.

BRIEF DESCRIPTION OF THE DRAWINGS

The novel features believed to be characteristic of this invention are set forth with particularity in the appended claims. The invention itself, however, both as to its organization and method of operation, together with further object and advantages thereof, may best be understood by reference to the following description taken in connection with the accompanying drawings in which:

FIG. 2 is a left end elevational view of the holster blank of the invention shown in FIG. 1, which end will become the top or pistol insertion end of the holster when formed;

FIG. 3 is a right end elevational view of the holster blank of the invention shown in FIG. 1, which end will become the bottom end of the holster when formed;

FIG. 6A is a top plan view of the holster blank of the invention, illustrating portions that will become the outside of the holster when formed;

FIG. 6B is a bottom plan view of the holster blank of the invention, illustrating portions that will become the inside of the holster when formed;

FIG. 7D provides a detailed perspective view of the female portion of the latch that will be used to join the two sides/halves of the holster blank together to form the holster of the invention;

FIG. 7E is a cut-away perspective view of the holster taken through the male and female portions of the latch when snapped together so as to join the two sides/halves of the holster blank together to form the holster of the invention;

FIG. 8 is a rear top perspective view of the holster body of the invention, formed by completing the process of folding the two sides/halves of the holster blank of the invention together, the two clam-like sides/halves which self-connect via the latch portions illustrated in FIGS. 7C through 7G to form the holster configuration illustrated;

FIG. 9 is a left end elevational view of he holster of the invention illustrated in FIG. 8, illustrating the bottom of the holster;

FIG. 10 is a right end elevational view of the holster body of the invention illustrated in FIG. 8, illustrating the top, or pistol insertion opening/end, of the holster;

FIG. 11 is a rear side elevational view of the holster body of the invention illustrated in FIG. 8, which faces inward towards the users body/belt adjacent thereto;

FIG. 12 is a front side elevational view of the holster body of the invention illustrated in FIG. 8, which faces outward away from the users body when the holster is mounted adjacent thereto;

FIG. 13 is a top plan view of the holster body of the invention illustrated in FIG. 8, which faces forward towards the user's front when the holster is mounted in standard fashion;

FIG. 14 is a bottom plan view of the holster body of the invention illustrated in FIG. 8, which faces towards the user's back when the holster is mounted in standard fashion;

DETAILED DESCRIPTION OF THE INVENTION

Figure 1:
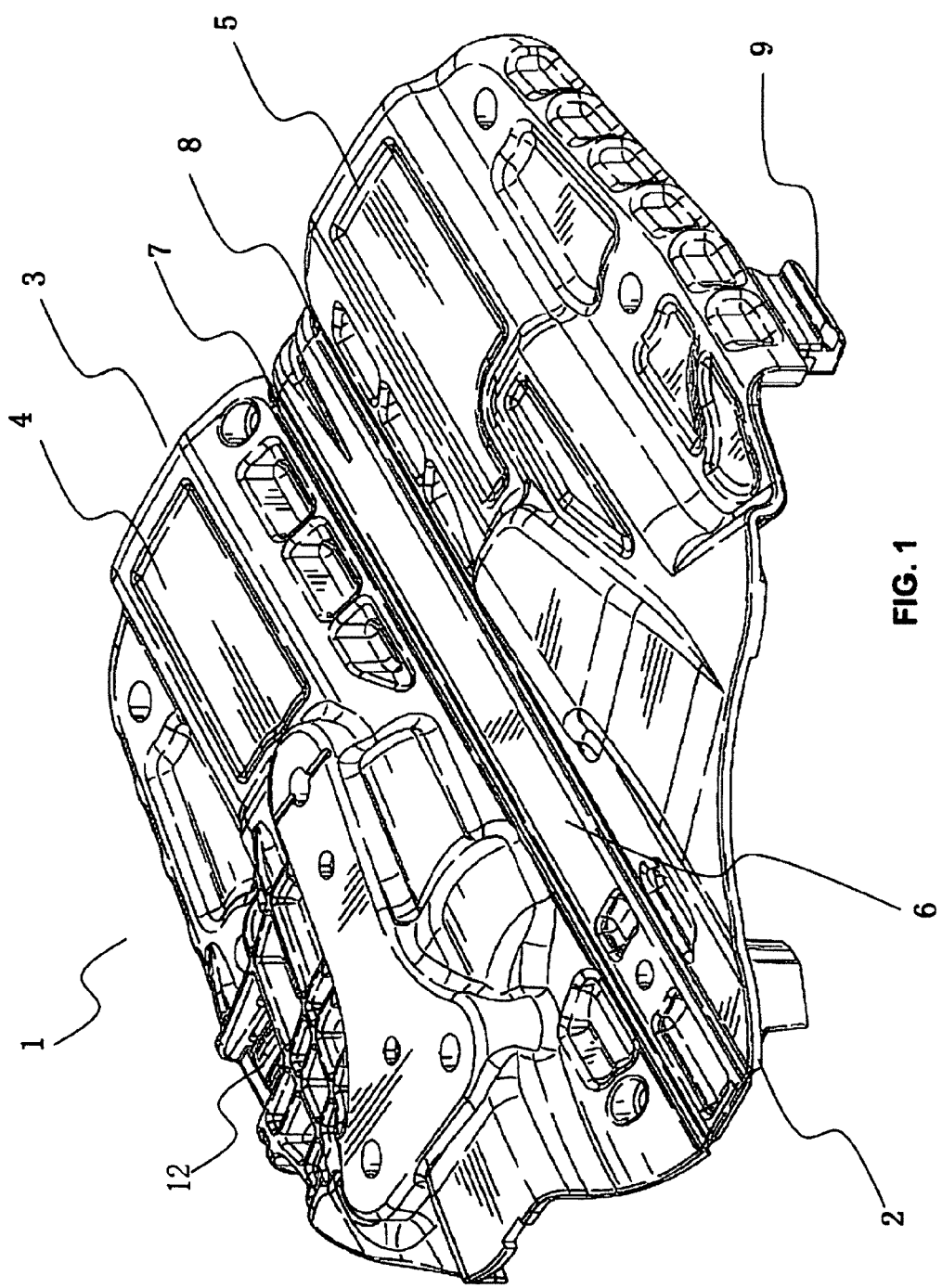
FIG. 1 is a front, top perspective view of the open holster blank of the invention, showing the outside surfaces of the holster when formed.
Figure 4:
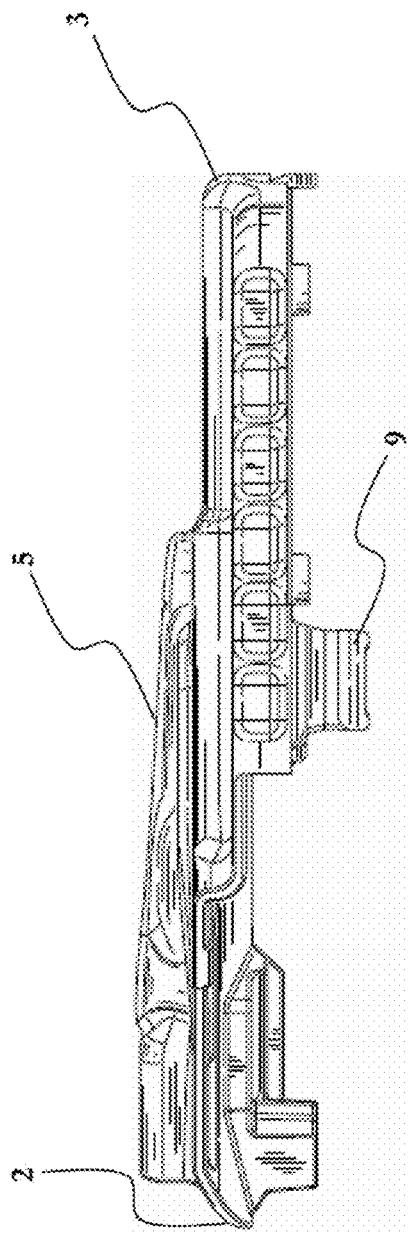
FIG. 4 is a right side elevational view of the holster blank of the invention shown in FIG. 1, which right side will be joined to the left side to become the front/outward side of the holster when formed.
Figure 5:
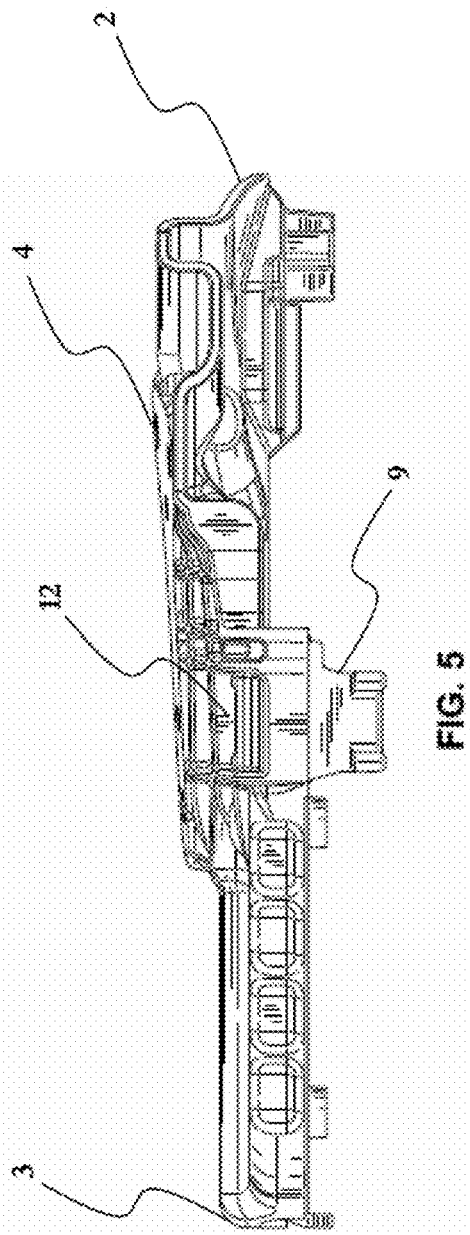
FIG. 5 is a left side elevational view of the holster blank of the invention shown in FIG. 1, which left side will be joined to the right side to become the back/belt side of the holster when formed.

With respect now to the drawings, FIGS. 1 through 6B illustrate the design and configuration of the basic injection molded one-piece holster blank 1 used in forming the holster 10 of the invention, illustrating many of the basic component parts of the invention and otherwise providing an introduction to its features. The sequence of portions initially denoted in the drawing figures will assist in orienting and understanding the various portions of the blank 1, comprising: the edges that will become the top 2 of the holster 10, the edges that will become the bottom 3 of the holster 10, the section/side that will become the back 4 or belt mounting side of the holster 10, the section/side that will become the front or outward side 5 of the holster 10, and a generally linear spine portion 6 joining sides 4 and 5. As will be noted from these drawing figures, the blank 1 (and holster 10) is/are primarily defined by the last three basic parts named, i.e., it is comprised of a relatively rigid elongate intermediate narrow spine portion 6 joined by a first living hinge 7 to back side 4 and by a second living hinge 8 to front side 5, with each of the living hinge being substantially parallel to each other and each being adapted to bend through a 90 degree angle so as to bring back side 4 into contact with front side 5, The male latch element 9 and female latch element 12 are readily visible in many of the aforesaid drawing figures.

Figure 7A:
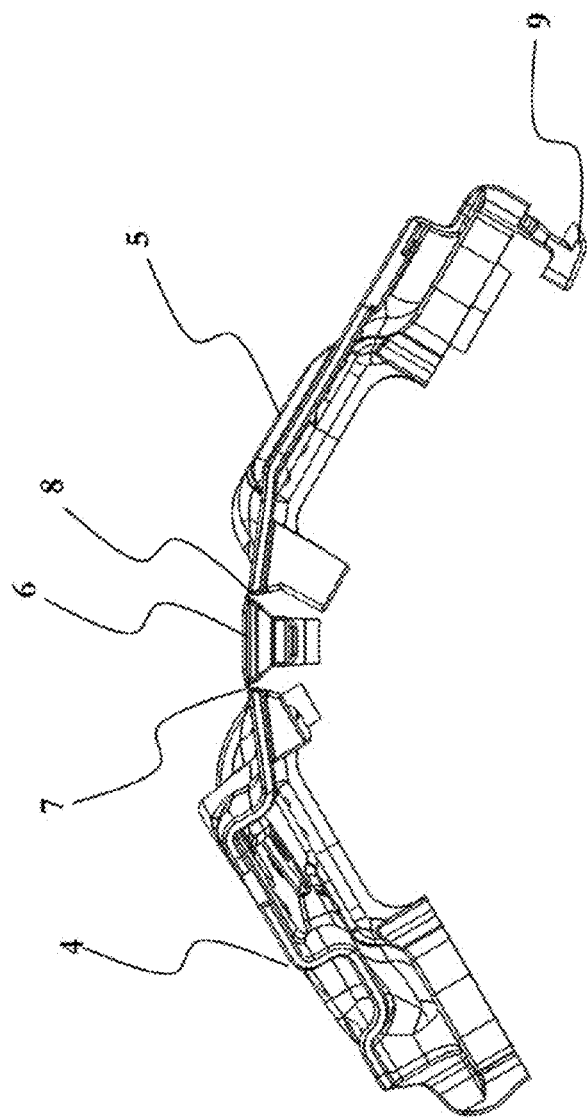
FIG. 7A is a top end elevational view of the holster blank of the invention in the process of being folded to form the holster of the invention, with each side bent away from the horizontal and towards each other by 30 degrees.
Figure 7B:
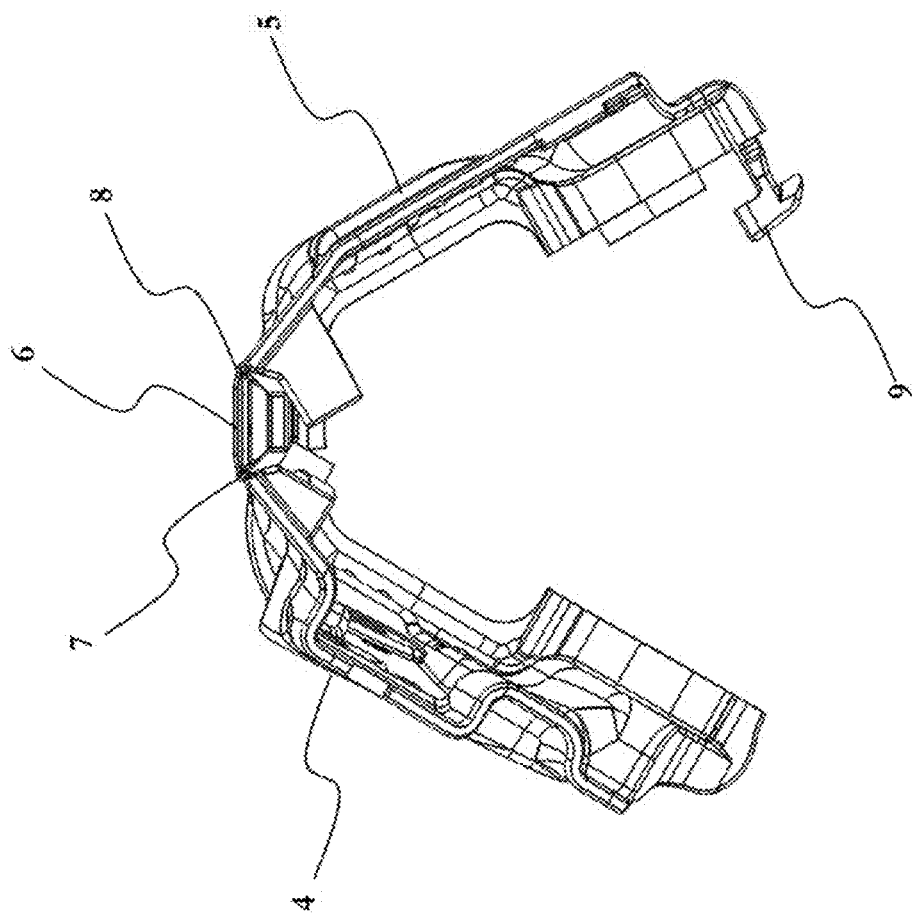
FIG. 7B is a top end elevational view of the holster blank of the invention in the process of being folded to form the holster of the invention, with each side bent away from the horizontal and towards each other by 60 degrees.
Figure 7C:
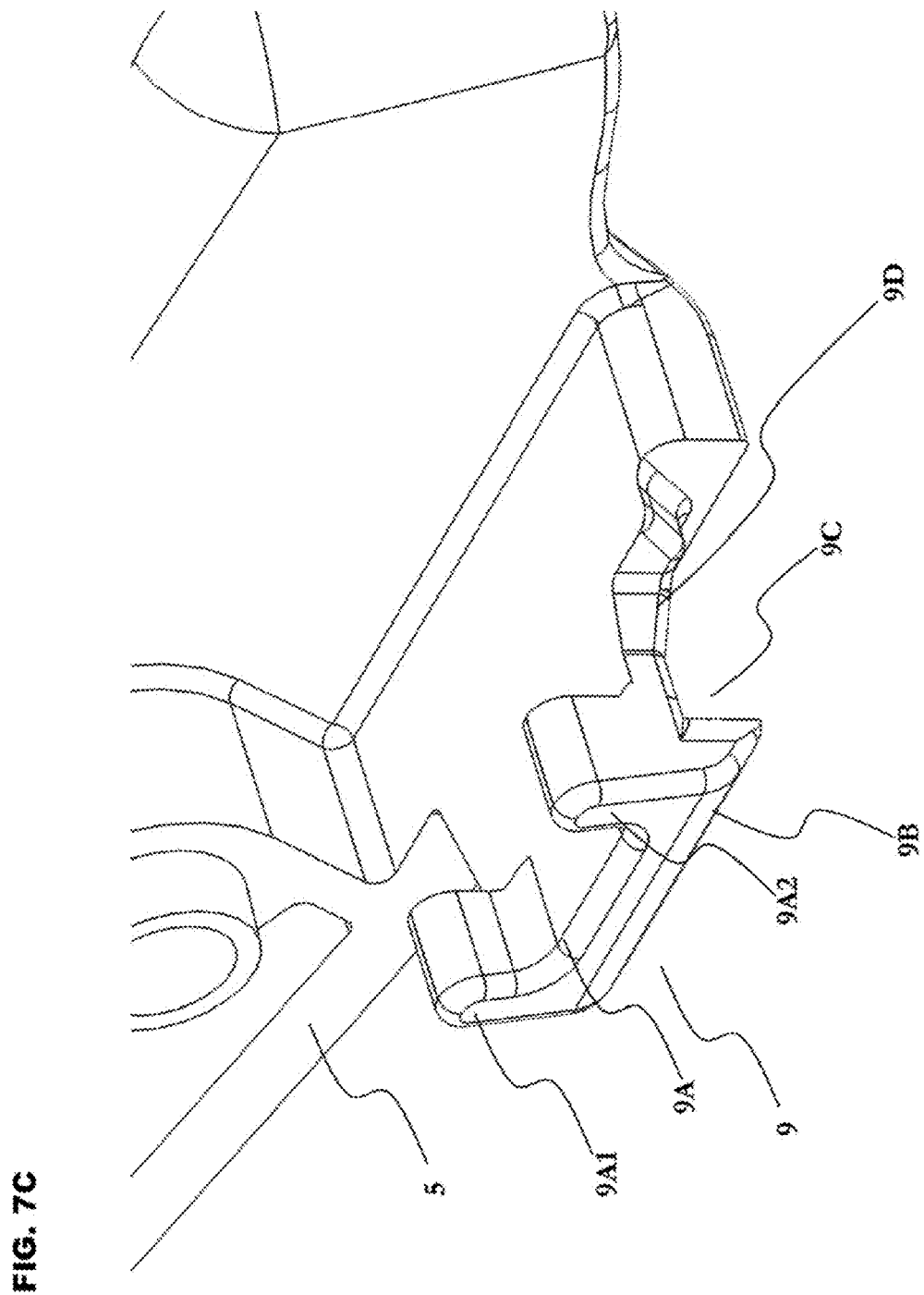
FIG. 7C is a detailed perspective view of the male portion of the latch that is used to join the two sides/halves of the holster blank together to form the holster of the invention.
Figure 7F:
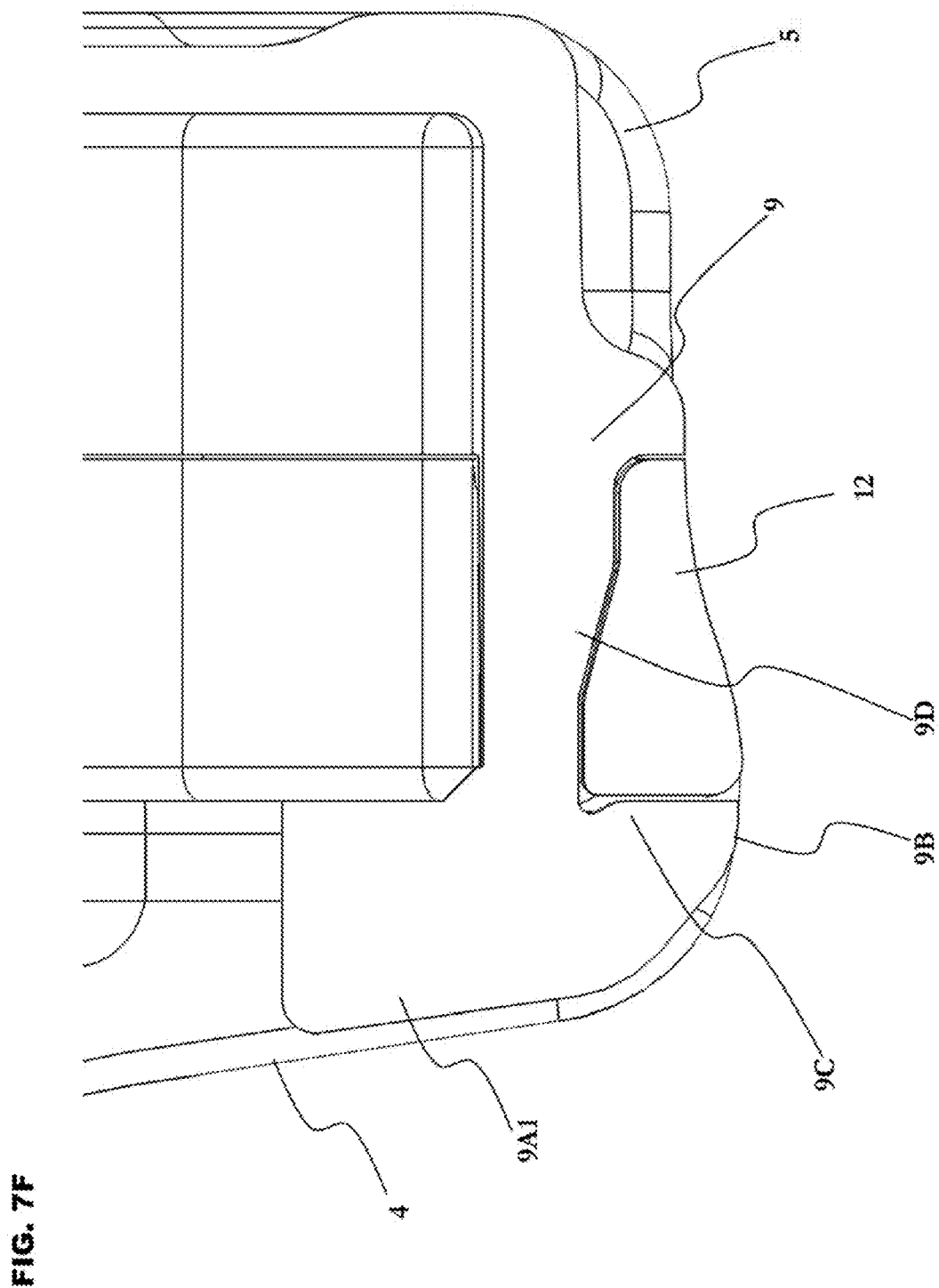
FIG. 7F is a cross-sectional view of the male and female portions of the latch when snapped together so as to join the two sides/halves of the holster blank together to form the holster of the invention, with the living hinges being bent at 90°.
Figure 7G:
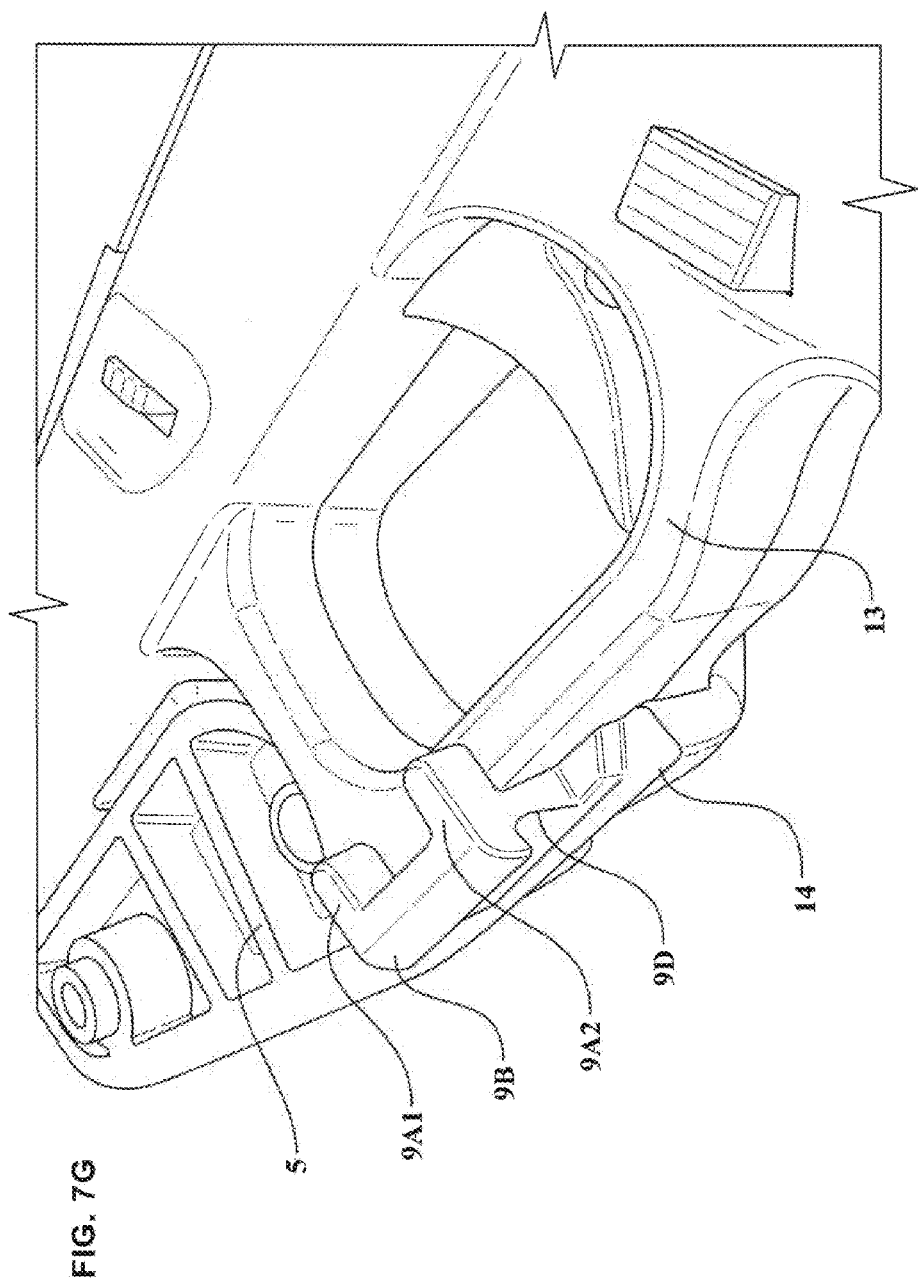
FIG. 7G is a perspective view of a pistol nested in the interior of the holster blank in what will become the front side of the holster when formed, further illustrating how the male portion of the latch interfaces with the trigger guard of a pistol.
Figure 7H:
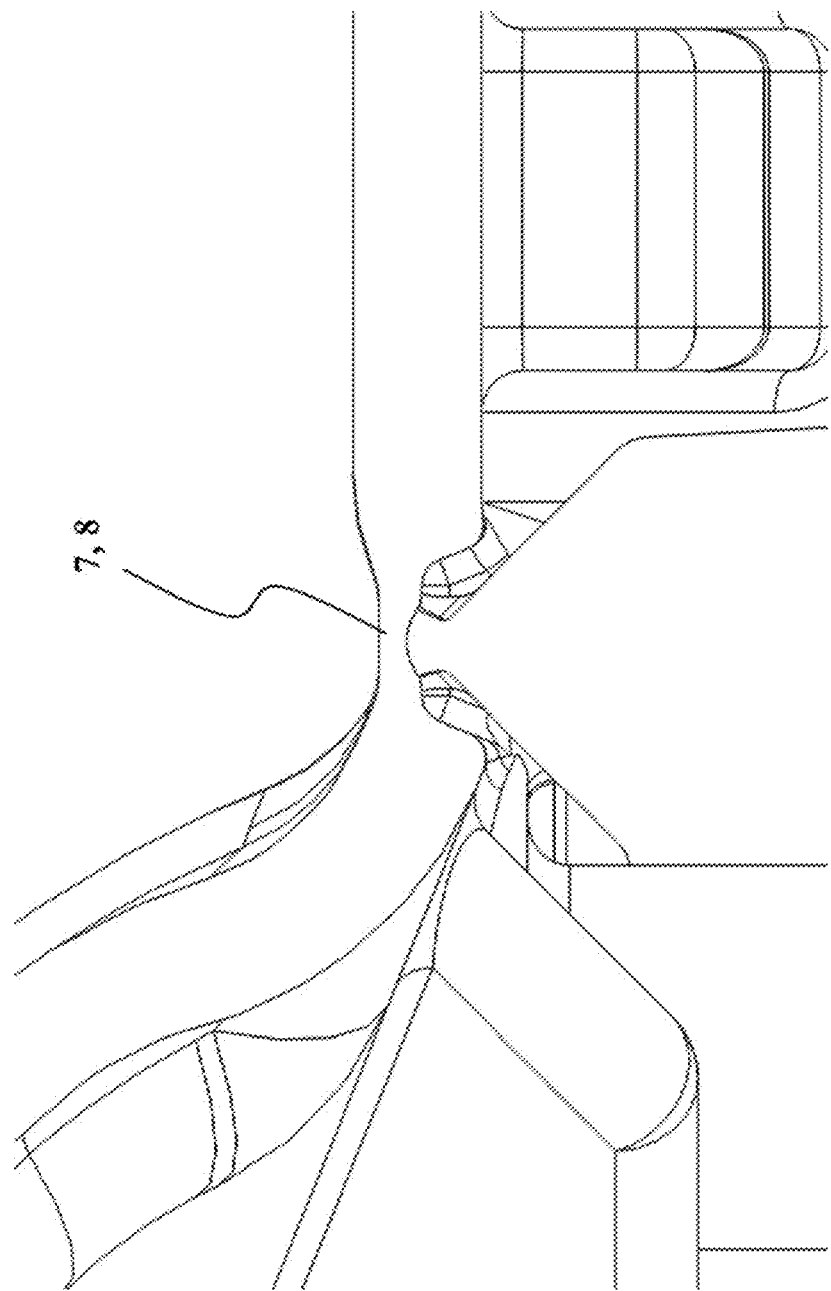
FIG. 7H provides a cross-sectional detail view of a living hinge of the invention in a partially bent/deflected position.
Figure 15:
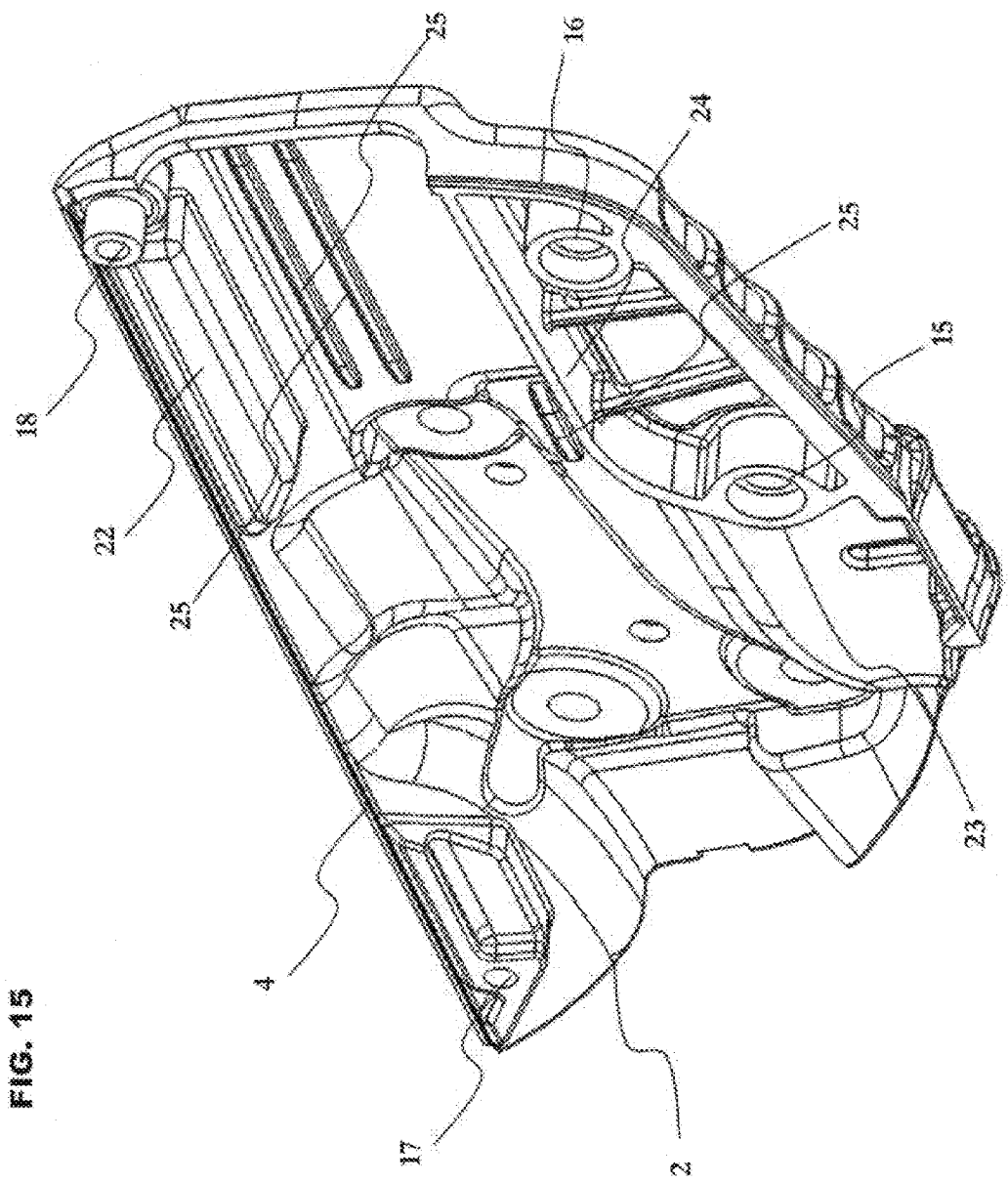
FIG. 15 is a first perspective view of the interior of the back/belt side of the holster of the invention.
Figure 16:
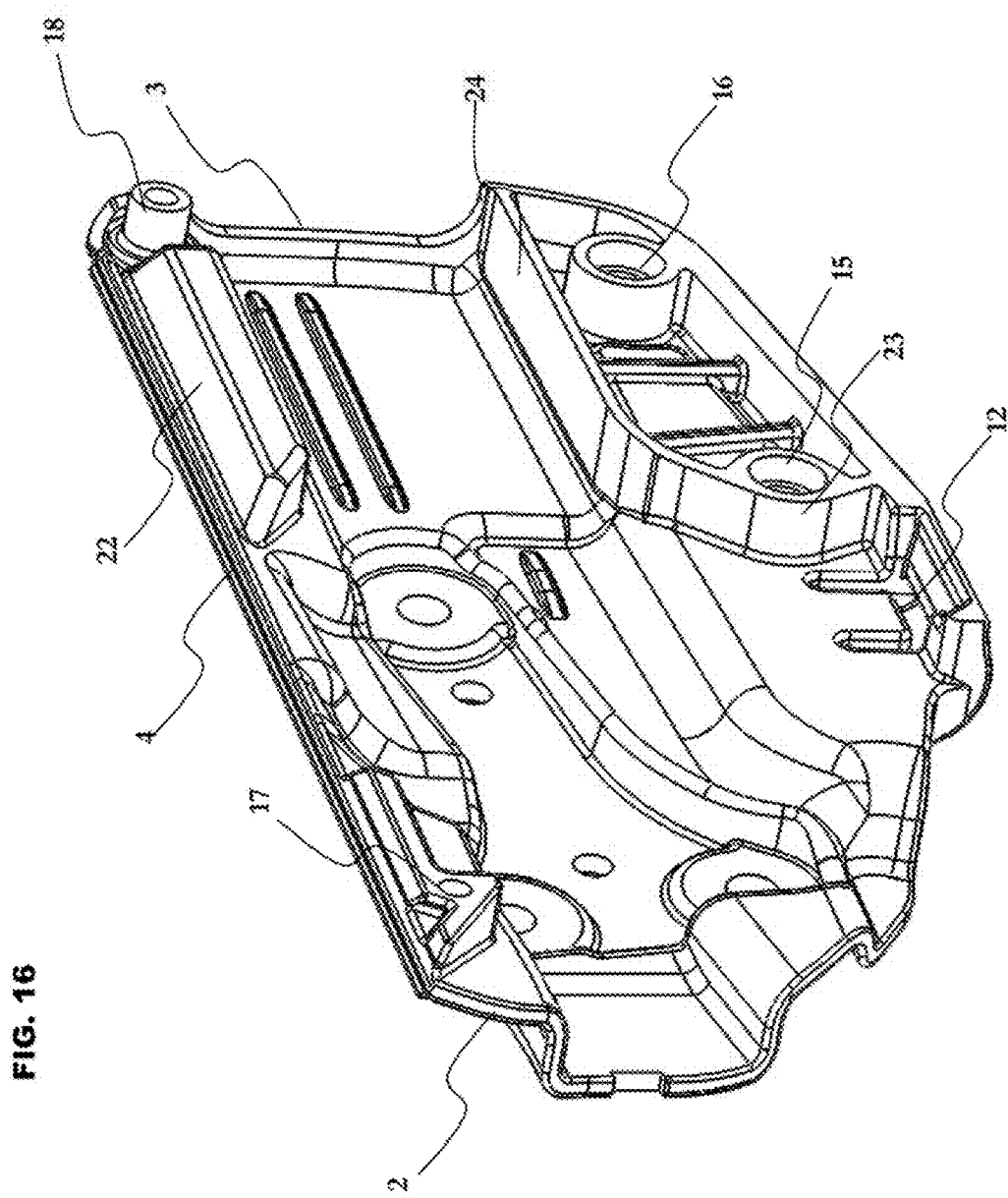
FIG. 16 is a second perspective view of the interior of the back/belt side of the holster of the invention.

By expanding the scope of consideration to include FIGS. 7A and 7B it can be seen how the front half 5 and back half 4 of the holster blank 1 can be folded inward toward each other until they touch/lock (forming the holster 10 illustrated in FIG. 8) via the trigger guard lock 11 comprising male lock/latch element 9 and female lock/latch element 12 (including the various subparts thereof discussed below), engages and locks the halves 4, 5 together. The various components comprising trigger guard lock 11 can best be seen in FIGS. 7C through 7G. Trigger guard lock 11 forms a vital component of the injection molded holster 10. It not only locks the two halves 4, 5 of the holster 10 together, it provides an extremely strong connection and reinforcement adjacent a trigger guard 13 of a handgun nested in the trigger guard area 14 of the holster 10 where the highest force is applied during the snatch test. The lock 11 is designed to be easy to snap together, but virtually impossible to disengage without the use of a tool. The male portion 9 of the lock 11 is elongated along a longitudinal axis of the holster 10 and includes a U-shaped protrusion 9A. The two prongs 9A1, 9A2, that form the "uprights" of the "U-shape" protrusion 9A, directly contact the back side of a trigger guard 13 on a handgun inserted into holster 10. (See, FIG. 7F).

The lower face 9B of the male portion 9 of the lock 11 is chamfered to allow easy engagement into the female portion 12 of the lock. The back side 9C of the male portion 9 is cleared out at a near right angle cut. The cut away area of back side 9C forms the locking surface against the outside of the female lock portion 12, and is primarily responsible for resisting the forces applied in a snatch test. The female portion 12 provides a pocketed area 12A for the neck 90 of the male lock element 9 to interface. The female lock portion 12 is elongated along a longitudinal axis of the holster 10 and also contains an engagement tab 12B that pushes out of the way during install, but then engages into the "U" portion 9A of the male lock portion 9 preventing the male lock portion 9 from working its way out of the U-shaped slot 12C in the female lock portion 12 This engagement tab 12B must be pried out of the way with a flat blade screwdriver or the like in order to disengage the male lock portion 9 from the female lock portion 12.

The holster 10 of the invention is also secured together at four additional engagement points 15, 16, 17 and 18, which assist in maintaining both halves 4, 5 of the holster 10 secured and engaged and prevent detachment during a snatch test. There are apertures for two spaced large trusshead screws (engagement points 15, 16) located along the "keel" of the holster 10 slightly below the trigger guard lock 11 to provide additional reinforcement against forces that are applied to the trigger guard 13 during a snatch test. There are also two spaced plastic threading screw apertures (engagement points 17, 18) located just below the living hinges 7, 8 adjacent the upper end 2 and lower end 3 of the holster 10. These two plastic threading screw engagement points 17, 18 serve two functions. The first is to assist in relieving any load against the living hinges 7, 8 during a snatch test. The second is to assist in pulling the spine portion 6 edge/side of the holster 10 together as the living hinges 7, 8 resists the halves 4, 5 of the holster 10 coming perfectly together. The holster 10 also has a "Grid" of external structural ribs 19 that reinforce the trigger guard area 14 and resists the bending that can lead to failure of the trigger guard lock 11 during a snatch test. The holster 10 uses the same belt loop/accessory mounting platform 20 and screw pattern currently used in thermoformed ALS holsters.

There are several internal features in the holster that are also important to the functionality of the invention. To begin with, in the ALS lock area there is a socket and a screw mounting hole 21 in the top-inside surface of the holster where the ALS "Lever-Lock" mounts. This ALS "Lever-Lock" is currently used on all of the ALS thermoformed holsters, and will work in the exact same manner in the context of the instant invention. (See, U.S. Pat. No. 7,694, 860, which is incorporated herein by reference). A second group of important internal features relate to "contact points" that are important to the support and positioning of a handgun in the holster 10. The first contact point is an upper slide contact boss 22. This feature is located on both halves of the holster, below the living hinges 7, 8. The contact bosses 22 protrude toward the inside of the holster 10 and provide contact with the top of the slide of the handgun when inserted therein. The contact bosses 22 do not protrude so far inside the holster 10 as to interfere with the front sight of the handgun. When the holster blank 1 is folded together to form holster 10, there remains a gap between each of the upper contact bosses 22 to allow a front sight to pass between them when the handgun is inserted into and withdrawn from the holster 10.

Another internal feature of note is the trigger guard stop/receiver rest 23. This feature defines the forward limit of the handgun as it is inserted into the holster 10. The trigger guard stop 23 provides a barrier that the forward section of the trigger, guard on the handgun butts up against when inserted into holster 10. The lower receiver rest 24 is the portion of this feature that the bottom of the handgun below the slide (receiver) rests against In addition, contact ribs 25 are present on the inside surfaces of both halves 4, 5 of the holster 10, and contact the handgun along the receiver, slide and grip. The contact ribs 25 allow the manufacturer/producer of the invention to easily add or reduce the pressure on the handgun due to manufacturing variations in the size of the ribs 25. The contact ribs 25 are small in height, and can be reduced or eliminated if the fit of the handgun is too tight. Conversely, the ribs 2 can be increased in height should the handgun fit be too loose.

Other features of note include build-ups 26 for the protection of the magazine release from accidental engagement. Finally, the muzzle end of the holster features well rounded corners and edges to protect seat cushions from being scratched or punctured. Also, there are several depressed regions on either side of the holster that don't serve an operational function. These are there for material removal purposes to maintain a consistent wall thickness, or for cosmetics.

PARTS AND FEATURES ILLUSTRATED IN DRAWING

Figures:
  1 holster blank
  2 top of the holster
  3 bottom of the holster 4 back/belt mounting side of the holster
5 front/outward side of the holster
6 linear spine portion joining sides 4 and 5
7 first living hinge joining side 4 to spine 6
8 second living hinge joining side 5 to spine 6
9 male latch portion
9A u-shaped protrusion portion of male latch element 9
9A1, 9A2 two prongs that form the "uprights" of the "U-shape" protrusion 9A
9B lower face of the male portion 9
9C back side of the male portion 9
9D neck of the male lock portion 9
10 holster formed from holster blank 1
11 trigger guard lock 11—comprising male lock/latch element 9 and female lock/latch element 12 and sub-components
12 female lock portion
12A pocketed area of female portion 12
12B engagement tab of female lock portion 12
12C U-shaped slot in the female lock portion 12
13 trigger guard of pistol
14 trigger guard area of the holster 10
15, 16 engagement points/apertures for large truss-head screws
17, 18 plastic threading screw apertures/engagement points
19 grid of external structural ribs that reinforce the trigger guard area 14
20 belt loop/accessory mounting platform
21 socket and a screw mounting hole 21 for mounting ALS "Lever-Lock"
22 upper slide contact boss
23 trigger guard stop
24 lower receiver rest
25 contact ribs
26 build-ups protecting the magazine release from accidental engagement In view of the foregoing, it should be clear that numerous changes and variations can be made without exceeding the scope of the inventive concept outlined. Accordingly, it is to be understood that the embodiment(s) of the invention herein described is/are merely illustrative of the application of the principles of the invention. Reference herein to details of the illustrated embodiment(s) is not intended to limit the scope of the claims, which will recite those features regarded as essential to the invention.

The invention claimed is:

1. A holster blank comprising:
a one-piece molded rigid plastic body portion having two molded side holster portions generally conforming to the sides of the handgun to be received in the formed holster, the two side holster portions joined to opposite edges of an elongate intermediate narrow spine portion by a spaced pair of elongate respective living hinges extending substantially parallel to each other;
said side holster portions include respective outer edges spaced from the respective living hinges and said outer edges being adapted to be connected together by folding said side holster portions towards each other via said respective living hinges so as to form a holster for a handgun;
said intermediate portion being disposed adjacent to a barrel of a handgun disposable within the holster when formed, said side holster portions being disposed adjacent sides of a handgun disposable within the holster when formed and the outer edges having trigger guard portions being disposed adjacent and in engagement of a trigger guard of a handgun disposable within the holster when formed;
and a lock connecting the outer edges of the two side holster portions.

2. The holster blank of claim 1, further comprising a lock having a male portion located at one of said outer edges and a female portion located at another of said outer edges, said male and female portions being engaged with each other to firmly lock said outer edges together to form the holster when said outer edges are brought together.

3. The holster blank of claim 2, wherein said male and female portions are elongated along a longitudinal axis of the holster when formed and along and parallel to pivot axes of the living hinges, the male portion having at least one trigger guard portion engaging a trigger guard of a handgun to reinforce and strengthen the holster and resist snatch forces of a handgun exertable on the holster.

4. The holster blank of claim 2, wherein the male portion of the lock includes a U-shaped protrusion having two spaced uprights and each of the two uprights of the U-shaped protrusion directly contacting the outside of the trigger guard on the side holster portion bearing the female lock portion when the lock is engaged,
the male portion of the lock has a lower face which is chamfered to permit ready engagement with the female portion of the lock,
a back side of the male portion being cleared out at a near right angle cut to create a cut away area that forms a locking surface against the outside of the female lock portion,
the female lock portion has a pocketed area with a U-shaped slot to receive a neck of the male lock portion,
the female lock portion includes an engagement tab that temporarily bends out of the way during engagement of the lock portions, but then returns to engage into the U-shaped portion of the male lock portion preventing the male lock portion from working its way out of the U-shaped slot in the female lock, and
the engagement tab being disengageable by forcibly prying the tab out of the way with a flat bladed tool in order to disengage the male lock portion from the female lock portion.

5. The holster blank of claim 2, further including additional spaced engagement structures for securing side holster portions together, said engagement structures serving to reinforce the connection between said side holster portions adjacent at least one of said intermediate spine portion so as to reinforce the connection of the side holster portions to the intermediate spine portion via the respective living hinges and resist pistol snatch forces exerted on the holster, and adjacent at least said outer edges so as to reinforce the connection of the outer edges via said lock and resist handgun snatch forces exerted on the holster.

6. The holster blank of claim 5, wherein said engagement structures include at least one of interfacing truss head screw apertures in said side holster portions proximate said trigger guard portions, and spaced threading screw apertures proximate said intermediate spine portion.

7. The holster blank of claim 1, further including at least one of:
a socket and a screw mounting hole in a top-inside surface of the intermediate spine portion for mounting of a lever lock to secure a handgun in a formed holster;
an upper slide contact boss formed by features on the side holster portions when brought together that protrude inside the holster when formed and provide contact with a top of a slide of a handgun when inserted therein;

an upper slide contact boss formed by features on the side holster portions when brought together that do not protrude inside the holster sufficiently to interfere with a front sight of a handgun when inserted into and withdrawn from the holster;

an upper slide contact boss formed by features on the side holster portions when brought together that includes a gap to allow a front sight to pass between them when a handgun is inserted into and withdrawn from the holster;

a trigger guard stop/receiver rest formed by features on the side holster portions when brought together that provides a forward limit of a handgun insertable into the holster;

a lower receiver rest formed by features on the side holster portions when brought together that engage a handgun below its slide when inserted into the holster;

contact ribs formed on the side holster portions that contact a handgun inserted into the holster along the receiver slide and grip;

a belt loop/accessory mounting platform formed in a side holster portion; and a grip exterior structural ribs formed on side holster portions proximate the trigger guard portion to resist bending due to snatch forces exerted on a handgun holsterable in the holster.

8. A method for producing a holster from a holster blank according to claim 1, comprising:
molding a unitary body portion having two side holster portions joined to opposite edges of an elongate intermediate spine portion by a pair of spaced respective living hinges extending parallel to each other, wherein the side holster portions have respective outer edges opposite the respective living hinges by which they are connected to the intermediate spine portion; and
pivoting each of the side portions toward each other until brought together via the respective living hinges so as to form a holster for a handgun with the intermediate spine portion laying adjacent to a top of a barrel of a handgun disposable within the holster when formed, and said holster portions laying adjacent sides of a handgun disposable within the holster.

9. The method of claim 8, further comprising providing a lock having a male portion located at one of the respective outer edges and a female portion located at the other respective outer edge such that the male and female portions located at the outer edges engage with each other to lock said outer edges together to form the holster when the outer edges are brought together.

10. The method of claim 9, further comprising:
locating the male and female portions adjacent to and engaging a trigger guard of a handgun disposable within the holster when formed to provide reinforcement to the male and female portions to resist snatch forces of a handgun exerted on the holster.

11. The method of claim 10, further comprising:
providing the male portion of the lock with a U-shaped protrusion having two uprights and the two uprights of the U-shaped protrusion directly contacting the outside of a trigger guard of a handgun disposable in the holster and female lock portion when the lock is fully engaged to enhance the resistance of handgun snatch forces exerted on the holster.

12. The method of claim 11, further comprising:
providing the male portion of the lock with a lower face which is chamfered to permit easy bending engagement with the female portion of the lock.

13. The method of claim 12, further comprising:
providing a back side clearance of the male portion to create a cutaway area that forms a locking surface against the outside of the female lock portion.

14. The method of claim 13, further comprising:
providing the female lock portion with a pocketed area for the two uprights of the male lock portion.

15. The method of claim 14, further comprising:
providing the female lock portion with an engagement tab that bends out of the way during engagement of the lock portions, but then firmly engages into a U-shaped portion of the male lock portion preventing the male lock portion from working its way out of a U-shaped slot in the female lock, and
removing the engagement tab by forcibly bending and being pried with a flat bladed tool to disengage the male lock portion from the female lock portion.

16. The method of claim 8, wherein at least one of:
providing the body portion with a socket and a screw mounting hole in a top-inside surface of the intermediate portion for the mounting of an ALS lever lock and the mounting an ALS lever lock to the holster via the socket and screw mounting hole,
providing an upper slide contact boss formed by features on the side holster portions when brought together that protrudes inside the holster when formed and provides contact with a top of a slide of a handgun when inserted therein,
providing an upper slide contact boss formed by features on the side holster portions when brought together that does not protrude so far inside the holster as to interfere with a front sight of a handgun when inserted into and withdrawn from the holster,
providing an upper slide contact boss formed by features on the side holster portions when brought together that includes a gap to allow a front sight to pass therethrough when a handgun is inserted into and withdrawn from the holster.

17. A holster blank comprising:
an integral molded rigid plastic body portion having two side holster portions joined to opposite edges of an elongate intermediate narrow spine portion by a spaced pair of elongate respective living hinges extending substantially parallel to each other;
said side holster portions include respective outer edges spaced from the respective living hinges and said outer edges being adapted to be connected together by folding said side holster portions towards each other via said respective living hinges so as to form a holster for a handgun;
said intermediate portion being disposed adjacent to a barrel of a handgun disposable within the holster when formed, said side holster portions being disposed adjacent sides of a handgun disposable within the holster when formed and the outer edges having trigger guard portions being disposed adjacent and in engagement of a trigger guard of a handgun disposable within the holster when formed;
a lock having a male portion located at one of said outer edges and a female portion located at another of said outer edges, said male and female portions being engaged with each other to firmly lock said outer edges together to form the holster when said outer edges are brought together;

said male and female portions are elongated along a longitudinal axis of the holster when formed and along and parallel to pivot axes of the living hinges, the trigger guard portions engaging a trigger guard of a handgun to reinforce and strengthen the holster and resist snatch forces of a handgun exertable on the holster; and additional spaced engagement structures for securing side holster portions together, said engagement structures serving to reinforce the connection between said side holster portions adjacent at least one of said intermediate spine portion so as to reinforce the connection of the side holster portions to the intermediate spine portion via the respective living hinges and resist pistol snatch forces exerted on the holster, and adjacent at least said outer edges so as to reinforce the connection of the outer edges via said lock and resist handgun snatch forces exerted on the holster.

18. The holster blank of claim 3, wherein the male portion of the lock includes a U-shaped protrusion having two spaced uprights and each of the two uprights of the U-shaped protrusion directly contacting the outside of the trigger guard on the side holster portion bearing the female lock portion when the lock is engaged, the male portion of the lock has a lower face which is chamfered to permit ready engagement with the female portion of the lock, a back side of the male portion being cleared out at a near right angle cut to create a cut away area that forms a locking surface against the outside of the female lock portion, the female lock portion has a pocketed area with a U-shaped slot to receive a neck of the male lock portion, the female lock portion includes an engagement tab that temporarily bends out of the way during engagement of the lock portions, but then returns to engage into the U-shaped portion of the male lock portion preventing the male lock portion from working its way out of the U-shaped slot in the female lock, and the engagement tab being disengageable by forcibly prying the tab out of the way with a flat bladed tool in order to disengage the male lock portion from the female lock portion.

19. The holster blank of claim 17, wherein said engagement structures include at least one of interfacing truss head screw apertures in said side holster portions proximate said trigger guard portions, and spaced threading screw apertures proximate said intermediate spine portion.

20. The holster blank of claim 19, further including at least one of:

a socket and a screw mounting hole in a top-inside surface of the intermediate spine portion for mounting of a lever lock to secure a handgun in a formed holster;

an upper slide contact boss formed by features on the side holster portions when brought together that protrude inside the holster when formed and provide contact with a top of a slide of a handgun when inserted therein;

an upper slide contact boss formed by features on the side holster portions when brought together that do not protrude inside the holster sufficiently to interfere with a front sight of a handgun when inserted into and withdrawn from the holster;

an upper slide contact boss formed by features on the side holster portions when brought together that includes a gap to allow a front sight to pass between them when a handgun is inserted into and withdrawn from the holster;

a trigger guard stop/receiver rest formed by features on the side holster portions when brought together that provides a forward limit of a handgun insertable into the holster;

a lower receiver rest formed by features on the side holster portions when brought together that engage a handgun below its slide when inserted into the holster;

a lower receiver rest formed by features on the side holster portions when brought together that engage a handgun below its slide when inserted into the holster;

contact ribs formed on the side holster portions that contact a handgun inserted into the holster along the receiver slide and grip;

a belt loop/accessory mounting platform formed in a side holster portion; and a grip exterior structural ribs formed on side holster portions proximate the trigger guard portion to resist bending due to snatch forces exerted on a handgun holsterable in the holster.

\* \* \* \* \*